US012804270B2

(12) United States Patent
Kitayama

(10) Patent No.: US 12,804,270 B2
(45) Date of Patent: Nov. 17, 2026

(54) IMAGE CAPTURING AND PROCESSING APPARATUS CAPABLE OF IMPROVING DISPLAY VISIBILITY OF A HISTOGRAM SUPERIMPOSED ON A CAPTURED IMAGE, METHOD OF CONTROLLING SAME, AND STORAGE MEDIUM

(71) Applicant: CANON KABUSHIKI KAISHA, Tokyo (JP)

(72) Inventor: Toma Kitayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 19/013,511

(22) Filed: Jan. 8, 2025

(65) Prior Publication Data

US 2025/0240534 A1 Jul. 24, 2025

(30) Foreign Application Priority Data

Jan. 24, 2024 (JP) ................................ 2024-008532

(51) Int. Cl.
*H04N 23/71* (2023.01)
*G02B 27/01* (2006.01)
(Continued)

(52) U.S. Cl.
CPC ............... *H04N 23/71* (2023.01); *G06T 5/40* (2013.01); *H04N 13/106* (2018.05);
(Continued)

(58) Field of Classification Search
CPC ........ H04N 23/70; H04N 23/76; H04N 23/71; H04N 23/54; H04N 23/55; H04N 23/63; H04N 23/631; H04N 23/632; H04N 23/633; H04N 23/634; H04N 23/635; H04N 13/106; H04N 13/156; H04N 13/302; H04N 13/332; H04N 13/344; G06T 5/40; G06V 10/25; G02B 27/017; G02B 27/0172
See application file for complete search history.

(56) References Cited

U.S. PATENT DOCUMENTS

2004/0042791 A1* 3/2004 Suekane ................ H04N 23/61 348/E5.035
2013/0057729 A1* 3/2013 Ajito .................... H04N 23/634 348/254
(Continued)

FOREIGN PATENT DOCUMENTS

JP H0738801 A 2/1995

*Primary Examiner* — Twyler L Haskins
*Assistant Examiner* — Akshay Trehan
(74) *Attorney, Agent, or Firm* — Cowan, Liebowitz & Latman, P.C.

(57) ABSTRACT

An image processing apparatus acquires image signals of an optical image which is formed by an image capturing optical system and captured by an image sensor, and design information of the image capturing optical system. Luminance information is detected from the image signals. A histogram of the luminance information is generated and displayed on a display device. A system controller determines, based on the design information, a first area in which the optical image is formed on an imaging surface of the image sensor, and generates the histogram by using luminance information of pixels included in the first area.

13 Claims, 8 Drawing Sheets

(51) Int. Cl.

| | |
|---|---|
| ***G06T 5/40*** | (2006.01) |
| ***G06V 10/25*** | (2022.01) |
| ***H04N 13/106*** | (2018.01) |
| ***H04N 13/156*** | (2018.01) |
| ***H04N 13/302*** | (2018.01) |
| ***H04N 13/332*** | (2018.01) |
| ***H04N 13/344*** | (2018.01) |
| ***H04N 23/54*** | (2023.01) |
| ***H04N 23/55*** | (2023.01) |
| ***H04N 23/63*** | (2023.01) |

(52) U.S. Cl.
CPC ............. *H04N 23/54* (2023.01); *H04N 23/55* (2023.01); *H04N 23/63* (2023.01); *H04N 23/633* (2023.01); *G02B 27/017* (2013.01); *G06V 10/25* (2022.01); *H04N 13/156* (2018.05); *H04N 13/302* (2018.05); *H04N 13/332* (2018.05); *H04N 13/344* (2018.05)

(56) References Cited

U.S. PATENT DOCUMENTS

| | | | | |
|---|---|---|---|---|
| 2019/0253637 A1* | 8/2019 | Savoie | ...................... | G06T 5/40 |
| 2023/0281768 A1* | 9/2023 | Mizuno | .................. | G06V 10/25<br>382/168 |

* cited by examiner

IMAGE CAPTURING AND PROCESSING APPARATUS CAPABLE OF IMPROVING DISPLAY VISIBILITY OF A HISTOGRAM SUPERIMPOSED ON A CAPTURED IMAGE, METHOD OF CONTROLLING SAME, AND STORAGE MEDIUM

BACKGROUND

Technical Field

The aspect of the embodiments relates to an image processing apparatus that is capable of improving visibility, a method of controlling the same, and a storage medium.

Description of the Related Art

Image capturing apparatuses equipped with a display device, such as a liquid crystal panel, include one that is capable of displaying, when displaying an image (captured image) obtained by an image sensor on the display device, distribution information of luminance values of image capturing signals together with the image to change the white balance and the exposure condition at a time of image capturing. For example, Japanese Laid-Open Patent Publication (Kokai) No. H07-38801 describes a technique of converting luminance information of image capturing signals to a histogram and displaying the histogram on the display device in a state superimposed on a captured image.

In a case where the luminance information of image capturing signals is displayed on the display device as in the technique described in Japanese Laid-Open Patent Publication (Kokai) No. H07-38801, in general, the distribution of the luminance values of all pixels of the image sensor is displayed. At this time, there is no problem if an imaging surface of the image sensor is wholly covered by an optical image formed by an image capturing optical system.

On the other hand, there is a case where an optical image of an object is formed by the image capturing optical system using an all-around (circumference) fisheye lens is captured in a state wholly covering the imaging surface of the image sensor as viewed from an optical axis direction. In this case, the luminance values of pixels positioned outside the optical image on the imaging surface are reduced, which causes a so-called underexposure state or vignetting state. Similar to the conventional technique, when a histogram is generated by acquiring the luminance information from the whole imaging surface of the image sensor in this situation, a high peak appears on a low-luminance side, so that a peak of the luminance values within the optical image becomes extremely low. As a result, it is impossible to easily confirm the distribution of the luminance values of the optical image, which makes it difficult to perform e.g. exposure setting.

SUMMARY

According to a first aspect of the embodiments, there is provided an image processing apparatus including at least one processor, and a memory storing instructions that, when executed by the at least one processor, configure the at least one processor to function as: an acquisition unit configured to acquire image signals of an optical image which is formed by an image capturing optical system and is captured by an image sensor, and design information of the image capturing optical system, a detection unit configured to detect luminance information from the image signals, and a control unit configured to generate a histogram of the luminance information and display the generated histogram on a display device, wherein the control unit determines, based on the design information, a first area in which the optical image is formed on an imaging surface of the image sensor, and generates the histogram by using luminance information of pixels included in the first area.

According to a second aspect of the embodiments, there is provided an image capturing apparatus including an image sensor that converts an optical image formed by an image capturing optical system to image signals, and at least one processor and memory holding a program which makes the processor function as: an acquisition unit configured to acquire design information of the image capturing optical system, a detection unit configured to detect luminance information from the image signals, and a control unit configured to generate a histogram of the luminance information and display the generated histogram on a display device, wherein the control unit determines, based on the design information, a first area in which the optical image is formed on an imaging surface of the image sensor, and generates the histogram by using luminance information of pixels included in the first area.

According to a third aspect of the embodiments, there is provided an image capturing system including an image capturing apparatus, and a lens barrel that can be removably attached to the image capturing apparatus, wherein the lens barrel includes an image capturing optical system that guides incident light from an object to the image capturing apparatus, and a storage unit configured to store design information of the image capturing optical system, and wherein the image capturing apparatus includes an image sensor that converts an optical image formed by the image capturing optical system to image signals, a display device, and at least one memory and at least one processor which function as: an acquisition unit configured to acquire the design information from the lens barrel, a detection unit configured to detect luminance information from the image signals, and a control unit configured to generate a histogram of the luminance information and display the generated histogram on the display device, wherein the control unit determines, based on the design information, a first area in which the optical image is formed on an imaging surface of the image sensor, and generates the histogram by using luminance information of pixels included in the first area.

Further features of the disclosure will become apparent from the following description of exemplary embodiments (with reference to the attached drawings).

DESCRIPTION OF THE EMBODIMENTS

Hereinafter, embodiments will be described in detail below with reference to the attached drawings. The embodiments will be described in detail with reference to the attached drawings, by taking an image capturing apparatus as an example of an image processing apparatus according to the disclosure. Note that in the following description, the image capturing apparatus refers to a main body part of the image capturing apparatus equipped with an image sensor. However, an image capturing apparatus formed by integrating an image capturing lens with the apparatus body, such as a compact digital camera, is included in the image capturing apparatuses for convenience sake. As for a single-lens reflex camera and a mirrorless single-lens camera, in which a lens barrel (interchangeable lens) can be removably attached to the apparatus body, the configuration in which the lens barrel is attached to the image capturing apparatus is referred to as the "image capturing system".

Figure 1:
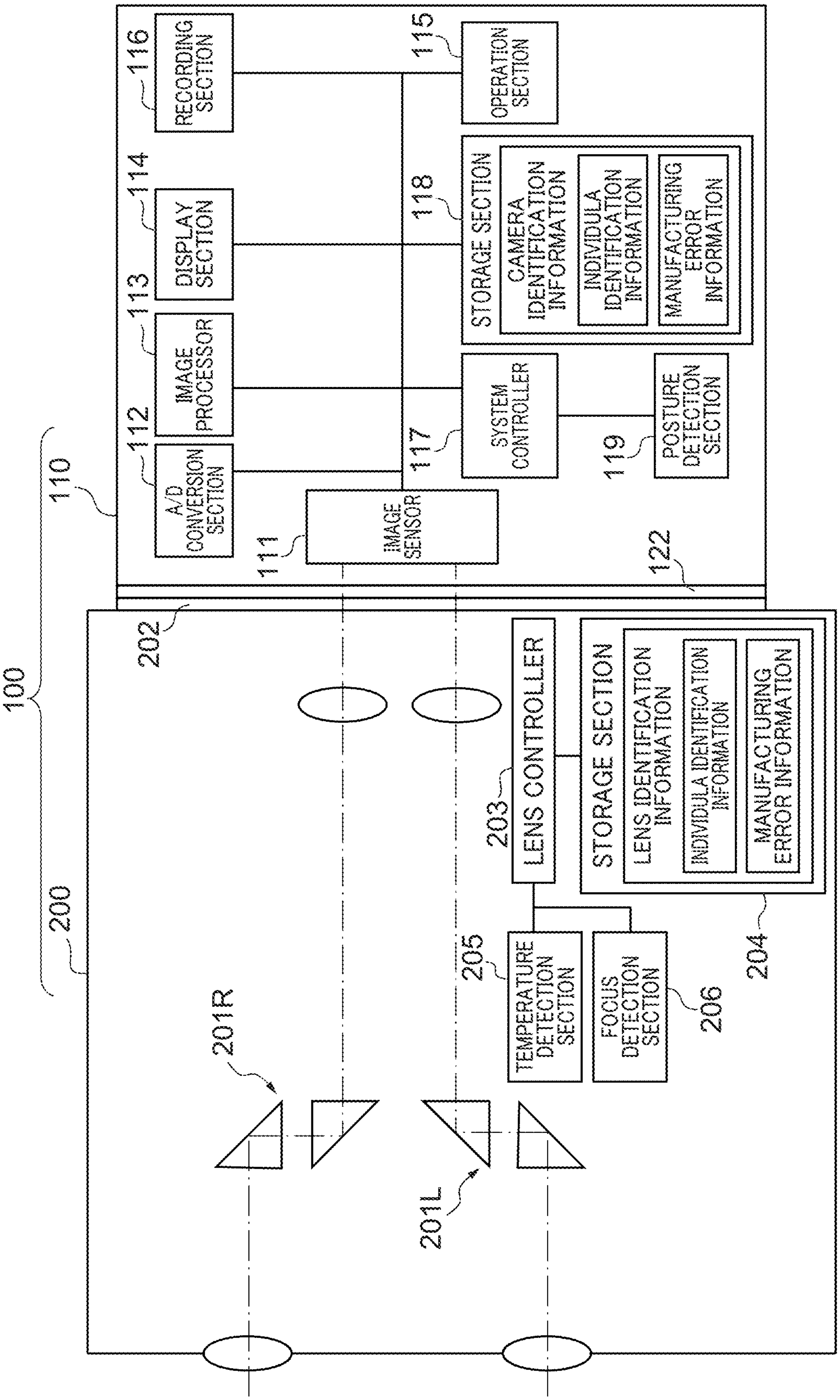
FIG. 1 is a block diagram showing a schematic configuration of an image capturing system according to a first embodiment.

FIG. 1 is a block diagram showing a schematic configuration of an image capturing system 100 according to a first embodiment. The image capturing system 100 is generally formed by an image capturing apparatus 110 and a lens barrel 200.

The image capturing apparatus 110 includes an image sensor 111, an A/D conversion section 112, an image processor 113, a display section 114, an operation section 115, a recording section 116, a system controller 117, a storage section 118, a posture detection section 119, and a camera-side mount (lens mount) 122.

The lens barrel 200 includes two image capturing optical systems of a right-eye optical system 201R and a left-eye optical system 201L, a lens-side mount (camera mount) 202, a lens controller 203, a storage section 204, a temperature detection section 205, and a focus detection section 206.

The image capturing apparatus 110 is a so-called digital camera. The camera-side mount 122 is part where attachment/detachment of the lens-side mount 202 included in the lens barrel 200 is performed e.g. by the bayonet engagement structure. An incident light flux (light reflected from an object) having passed through the lens barrel 200 forms an image on an imaging surface of the image sensor 111. The image sensor 111 is e.g. a CMOS sensor which converts the optical image of the object, which is formed on the imaging surface, to image signals as analog electrical signals, and the image signals are output to the A/D conversion section 112. The A/D conversion section 112 converts the analog electrical signals received from the image sensor 111 to image signals as digital electrical signals and outputs the generated image signals to the image processor 113. The image processor 113 performs a variety of image processing operations (so-called development processing) on the image signals received from the A/D conversion section 112 to generate image data. The system controller 117 is a microcomputer comprised of a CPU, and a memory, such as a read only memory (ROM) and a random access memory (RAM), and performs centralized control of the operation of the image capturing system 100.

The display section 114 includes an electronic viewfinder and a rear monitor and displays a variety of information. Note that the "rear monitor" refers to a variangle-type, tilt-type, or fixed-type liquid crystal display device or an organic EL display device, which is provided on a rear surface of the image capturing apparatus 110. The operation section 115 is a user interface, including a switch and a button used by a user to provide an instruction to the image capturing system 100, and a touch panel provided on the rear monitor. Further, live view display (LV) can be performed by controlling a D/A converter, not shown, to convert the digital electrical signals, which have been converted from analog to digital by the A/D conversion section 112 and accumulated in a memory, not shown, to analog electrical signals, sequentially transferring the analog electrical signals to the display section 114 or the like, and displaying the analog electrical signals.

The recording section 116 is e.g. a memory card and stores (records) a variety of data, such as an image file subjected to the image processing performed by the image processor 113. The posture detection section 119 is comprised of an acceleration sensor and a gyro sensor and detects a posture and movement of the image capturing system 100. Note that it is possible to estimate changes in the posture of the image capturing system 100 at a time of image capturing on a time-series basis based on information of the posture and the movement of the image capturing system 100, detected by the posture detection section 119.

The storage section 118 stores identification information of the image capturing apparatus 100 (hereinafter referred to as the "camera identification information"), written during a manufacturing process of the image capturing apparatus 100. The camera identification information includes individual identification information (such as model information, a serial number, pixel number information of the image sensor, and physical size information of the image sensor) and manufacturing error information (individual difference information in e.g. color and luminance of the image sensor 111) of the image capturing apparatus 110. When the image capturing system 100 is started, the system controller 117 reads out the camera identification information stored in the storage section 118, further acquires lens identification information (described hereinafter in detail) of the lens barrel 200 from the lens barrel 200, and transmits the camera identification information and the lens identification information to the image processor 113. The image processor 113 generates an image file by attaching the camera identification information and the lens identification information to image data of a captured image and stores the generated image file in the recording section 116. Note that the captured image refers to a captured still image or moving image.

When the lens barrel 200 is mounted on the image capturing apparatus 100 by fitting the lens-side mount 202 on the camera-side mount 122, the system controller 117 and the lens controller 203 are electrically connected to each other. With this, electric power is supplied from the image capturing apparatus 100 to the lens barrel 200, and the system controller 117 and the lens controller 203 are enabled to communicate with each other. The lens controller 203 is a microcomputer comprised of a CPU and a memory, such as a ROM and a RAM, and performs centralized control of the operation of the lens barrel 200 under the control of the system controller 117.

The right-eye optical system 201R and the left-eye optical system 201L are arranged such that a right-eye image and a left-eye image are formed through the respective optical systems, side by side, along a long side of the image sensor 111. Note that the details of the configuration of the right-eye optical system 201R and the left-eye optical system 201L will be described hereinafter with reference to FIG. 2, and the formed state of the optical image on the image sensor 111 will be described hereinafter with reference to FIGS. 4A and 4B, and the like.

The temperature detection section 205 detects a temperature around the lens barrel 200. The focus detection section 206 has a magnetic-type, optical-type, or resistance-type positional sensor and detects the respective focus information (focus lens position) of the right-eye optical system 201R and the left-eye optical system 201L.

The storage section 204 stores the lens identification information of the lens barrel 200. The lens identification information includes individual identification information and manufacturing error information. The individual identification information of the lens barrel 200 includes e.g. model information, a serial number, and optical design information (such as an aperture value range, a focal length, and distortion aberration). The manufacturing error information of the lens barrel 200 includes, for example, tilting information of the camera-side mount 122 with respect to the image sensor 111.

When the lens controller 203 is communicably connected to the system controller 117, the lens controller 203 receives a command from the system controller 117 and transmits the lens identification information stored in the storage section 204 to the system controller 117. Further, the lens controller 203 transmits the temperature information detected by the temperature detection section 205 and the focus information detected by the focus detection section 206 to the system controller 117 on an as-needed basis.

Figure 2:
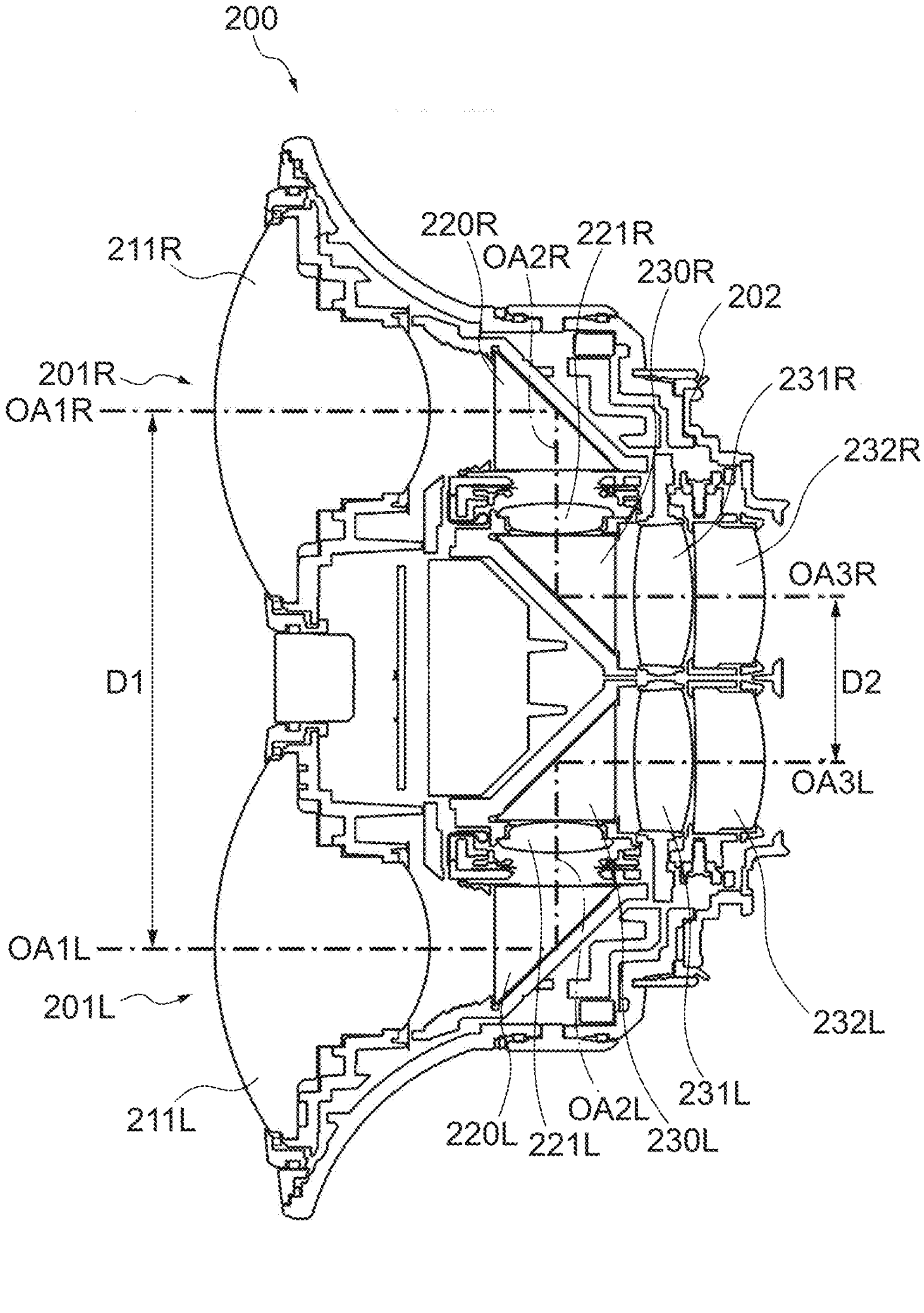
FIG. 2 is a cross-sectional view showing a general configuration of a lens barrel as a component of the image capturing system shown in FIG. 1.

FIG. 2 is a cross-sectional view showing a general configuration of the lens barrel 200 and shows a cross-sectional configuration at a plane including the respective image capturing optical axes of the right-eye optical system 201R and the left-eye optical system 201L. The right-eye optical system 201R and the left-eye optical system 201L are arranged within the lens barrel 200 in a state spaced away from each other by a predetermined distance in a horizontal direction when the image capturing system 100 is in a normal posture.

An optical image formed by the right-eye optical system 201R can be recorded (stored) as a moving image or still image for the right eye, and an optical image formed by the left-eye optical system 201L can be recorded as a moving image or still image for the left eye. For example, when a moving image captured by the image capturing system 100 is reproduced e.g. by a known 3D display or VR goggles such that a video for the right eye appears on the right eye of an appreciator and a video for the left eye appears on the left eye, videos having a parallax due to a base length D1 of the lens barrel 200 are projected to the right eye and the left eye. This enables the appreciator to appreciate the moving image having three-dimensional impression. Note that the method of reproducing a captured image is not directly related to the present disclosure, and hence description thereof is omitted.

The right-eye optical system 201R and the left-eye optical system 201L each function as an all-around fisheye lens and can perform image capturing in an angle of view of 180 degrees or more. The right-eye optical system 201R and the left-eye optical system 201L have the same configuration, and hence the right-eye optical system 201R will be described here.

The image capturing optical axis of the right-eye optical system 201R is formed by a first optical axis OA1R, a second optical axis OA2R substantially orthogonal to the first optical axis OA1R, and a third optical axis OA3R parallel to the first optical axis OA1R, in the mentioned order from the object side. A light flux along the first optical axis OA1R is refracted by a first prism 220R and guided to the second optical axis OA2R, and the light flux along the second optical axis OA2R is refracted by a second prism 230R and guided to the third optical axis OA3R. A first group lens 211R having a convex surface on the object side, a second group lens 221R, and third group lenses 231R and 232R are arranged on the first optical axis OA1R, the second optical axis OA2R, and the third optical axis OA3R, respectively. The all-around fisheye lens is formed by the first group lens 211R, the second group lens 221R, and the third group lenses 231R and 232R.

Note that FIG. 2 shows the component elements of the left-eye optical system 201L denoted by replacing "R" added to the end of each component element of the right-eye optical system 201R by "L". Holding members for holding the optical parts of the lens barrel 200, such as the lenses and the prisms, are not directly related to the present disclosure, and hence description thereof is omitted.

Figure 3:
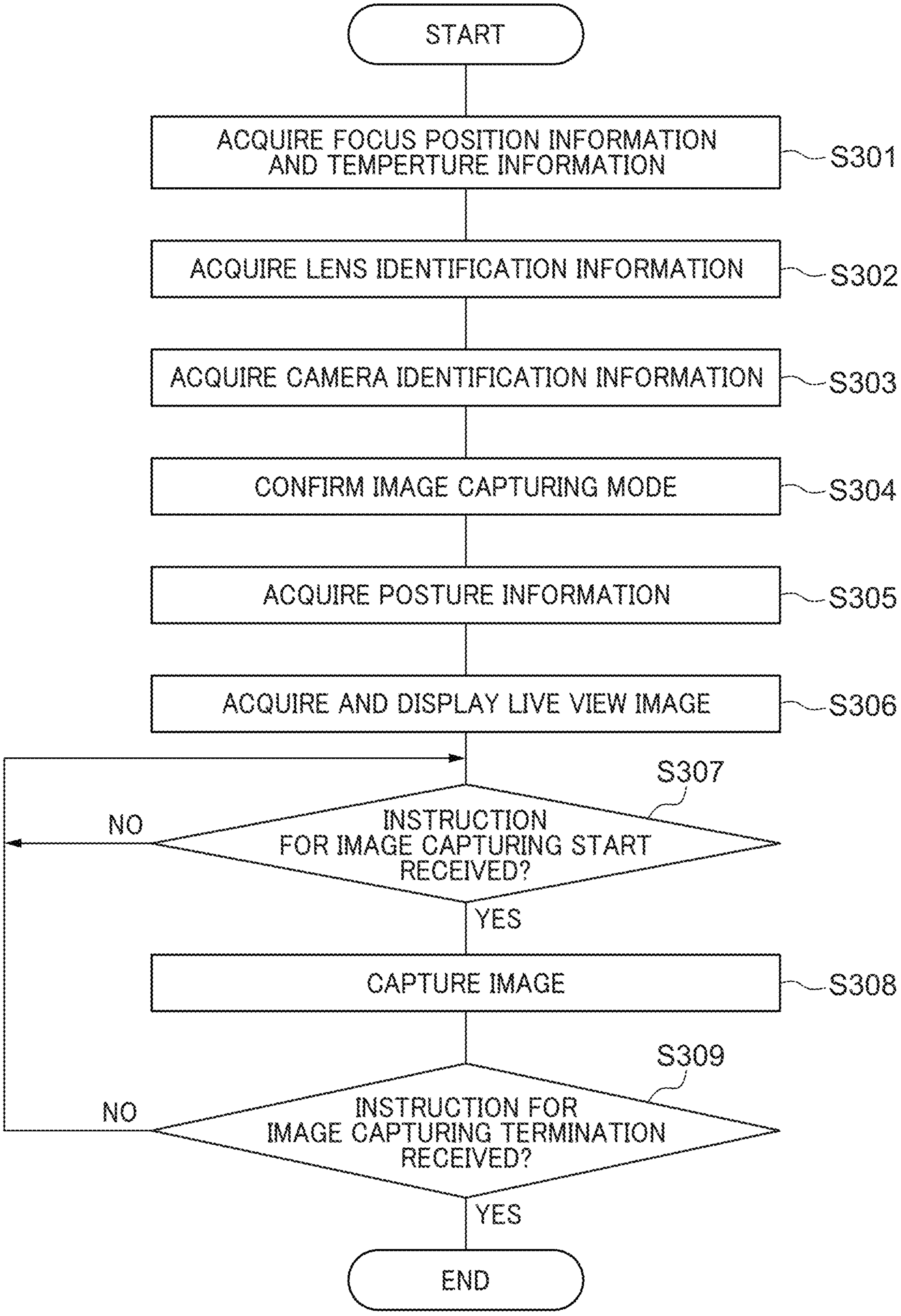
FIG. 3 is a flowchart useful in explaining operations performed at a time of image capturing by the image capturing system shown in FIG. 1.

Next, a flow of operations at a time of image capturing, which is performed by the image capturing system 100, will be described. FIG. 3 is a flowchart useful in explaining the operations performed at the time of image capturing by the image capturing system 100. Processing operations (steps) each denoted by S number in FIG. 3 are realized by the CPU of the system controller 117, which loads a predetermined program held in the ROM thereof into the RAM and performs centralized control of the components of the image capturing system 100 while cooperating with the lens controller 203. When a user turns on the image capturing apparatus 110, the system controller 117 and the lens controller 203 communicate with each other to start processing in a step S301.

In the step S301, the system controller 117 acquires the focus information and the temperature information of the lens barrel 200 from the lens controller 203.

As described above, the right-eye optical system 201R and the left-eye optical system 201L are each configured as the all-around fisheye lens. The all-around fisheye lens is configured to have a short focal length, and has a configuration close to pan-focus which does not frequently require focus adjustment because the depth of field is large. On the other hand, there is a case where it is desirable to perform focus adjustment because an out-of-focus state can be caused due to a small aperture value applied when using the image capturing apparatus 110 or due to a manufacturing error of the setting position of the image sensor 111. Further, aberration, such as distortion aberration, sometimes varies between the right-eye optical system 201R and the left-eye optical system 201L depending on a focusing point distance, and by acquiring the distortion aberration according to the focus position, it is possible to perform processing with higher accuracy, for example, when converting a captured image to a VR image later. For these purposes, the focus information is acquired. Further, the temperature information is acquired to correct the manufacturing error information, for example, when converting a captured image to a VR image later using the manufacturing error information of the lens barrel 200.

In a step S302, the system controller 117 acquires the lens identification information of the lens barrel 200, which is stored in the storage section 204, from the lens controller 203.

The individual identification information of the lens identification information includes the optical design information of the lens barrel 200. For example, the right-eye optical system 201R and the left-eye optical system 201L are arranged at a space interval close to the human eye width in the lens barrel 200 so as to obtain a proper parallax when a captured image is converted to a VR image to view the VR image. For example, the human eye width is said to be approximately 65 mm as an average, and hence a distance (inter-first optical axis distance D1) between the first group lens 211R and the first group lens 211L (base length at the forefront is designed to be 65 mm, and the information is included in the individual identification information.

Further, to form an optical image on one image sensor 111, the right-eye optical system 201R and the left-eye optical system 201L cause the light paths to be refracted by the first prisms 220R and 220L and the second prisms 230R and 230L, respectively. Therefore, a distance (inter-third optical axis distance D2) between the third group lenses 231R and 232R and the third group lenses 231L and 232L is different from the distance (inter-first optical axis distance D1) between the first group lens 211R and the first group lens 211Lat the forefront. Assuming that the image sensor 111 is a full-size sensor having a lateral width of 36 mm, two substantially circular optical images are required to be projected within this sensor size. Therefore, the inter-third optical axis distance D2 as a distance between the centers of the two optical images is set to approximately 18 mm, which is half of the lateral width of the image sensor 111, and this information is included in the individual identification information.

Thus, since the inter-first optical axis distance D1 and the inter-third optical axis distance D2 are largely different from each other, when a captured image is converted to a VR image, it is necessary to properly grasp the optical design values of the lens barrel 200 according to the captured image. For this reason, the lens identification information stored in the storage section 204 is notified to the system controller 117 and attached to the image data of the captured image.

Further, the lens barrel 200 includes a manufacturing error on an individual basis, and hence the lens identification information includes the manufacturing error information acquired in the manufacturing process. For example, in the lens barrel 200, the right-eye optical system 201R and the left-eye optical system 201L are ideally arranged in parallel but can be arranged in a state slightly displaced from the ideal parallel state due to a tolerance, a manufacturing error, and the like. Further, the right-eye optical system 201R and the left-eye optical system 201L can be not a little different in focal length and distortion ratio due to an assembly error of the lens position. The error information in the lens barrel 200, which is generated in this manufacturing process, is stored in the storage section 204 as the manufacturing error information.

Further, when the image capturing system 100 is used, the manufacturing error changes due to the surrounding temperature, and hence, temperature dependency of the manufacturing error of the lens barrel 200 is grasped when the lens barrel 200 is manufactured, and is stored in the storage section 204. So, the temperature information of the lens barrel 200 is acquired in the step S301, the manufacturing error information of the lens barrel 200 is acquired in the step S302, and these are attached to the image data of the captured image. This makes it possible to correct the manufacturing error when the captured image is converted to a VR image afterward. Note that data indicating a correlation between the manufacturing error and the temperature is used when a captured image is converted to a VR image, and hence this data is not necessarily required to be stored in the storage section 204 but can be acquired when the captured image is converted to the VR image.

In a step S303, the system controller 117 reads out the camera identification information stored in the storage section 118.

In a step S304, the system controller 117 confirms the image capturing mode. Note that the processing operations in the step S301 to S304 are not necessarily required to be executed in this order but are only required to be executed before the start of processing in a step S305.

In the step S305, the system controller 117 acquires the posture information of the image capturing system 100 (image capturing apparatus 110) from the posture detection section 119. The posture information of the image capturing system 100 is attached to the image data of the captured image and is used when the captured image is converted to a VR image later.

In a step S306, the system controller 117 controls acquisition and display of the live view image and displays the live view image on the display section 114. Note that in a case where it is determined that there is no input from the operation section 115 even after a predetermined time period has elapsed after the start of acquisition of the live view image, the system controller 117 terminates the control of acquisition and display of the live view image and enters a standby mode. Recovery from the standby mode is performed by using a known method.

In a step S307, the system controller 117 determines whether or not an image capturing start instruction has been received from the operation section 115. In a case where a still image is captured, whether or not a release button, not shown, which belongs to the operation section 115 of the image capturing apparatus 110 has been pressed is determined, and in a case where a moving image is captured, whether or not a moving image-recording button, not shown, which belongs to the operation section 115 of the image capturing apparatus 110 has been pressed is determined. Note that after moving image capturing has been started, the moving image-recording button is used as an operation member for terminating the moving image capturing when pressed again. If it is determined that the image capturing start instruction has been received (YES in S307), the system controller 117 executes processing in a step S308, whereas if it is determined that the image capturing start instruction has not been received (NO in S307), the system controller 117 continuously executes the processing in the step S306.

In the step S308, the system controller 117 executes image capturing. In the case of still image capturing, still image data is stored in the recording section 116 together with the information acquired in the steps S301 to S305. Although in the case of the still image capturing, actually, the step S306 is executed after execution of the step S308, illustration of the route is omitted from FIG. 3. In the case of the moving image capturing, frame image data is continuously stored in the recording section 116 together with the information acquired in the step S301 to S305 until an image capturing termination instruction (operation of pressing the moving image-recording button again) is received. Note that in the case of the moving image capturing, the processing operations in the steps S301 and S305 are executed at fixed time intervals during execution of the step S308.

In a step S309, the system controller 117 determines whether or not the image capturing termination instruction has been received from the operation section 115. The image capturing termination instruction substantially refers to an operation of turning off the image capturing apparatus 110 in the case of the still image capturing and refers to an operation of pressing the moving image-recording button again in the case of the moving image capturing.

If it is determined that the image capturing termination instruction has been received during the still image capturing (YES in S309), the system controller 117 terminates the image capturing, whereas if it is determined that the image capturing termination instruction has not been received (NO in S309), the system controller 117 returns to the step S307.

If it is determined that the image capturing termination instruction has not been received in the moving image capturing (NO in S309), although not shown, the system controller 117 continues to execute the step S308. Further, if it is determined that the image capturing termination instruction has been received in the moving image capturing (YES in S309), although not shown, the system controller 117 returns to the step S306, and when an instruction of turning off the image capturing system 100 has been received, the system controller 117 terminates the present flow.

Next, a form of display of an image on the display section 114 will be described. Here, it is assumed that, together with a captured image or a live view video (hereinafter referred to as the "image to be displayed"), a histogram indicating luminance information of the image to be displayed (hereinafter referred to as the "luminance histogram") is displayed on the display section 114 according to settings made in advance.

Figure 8A:
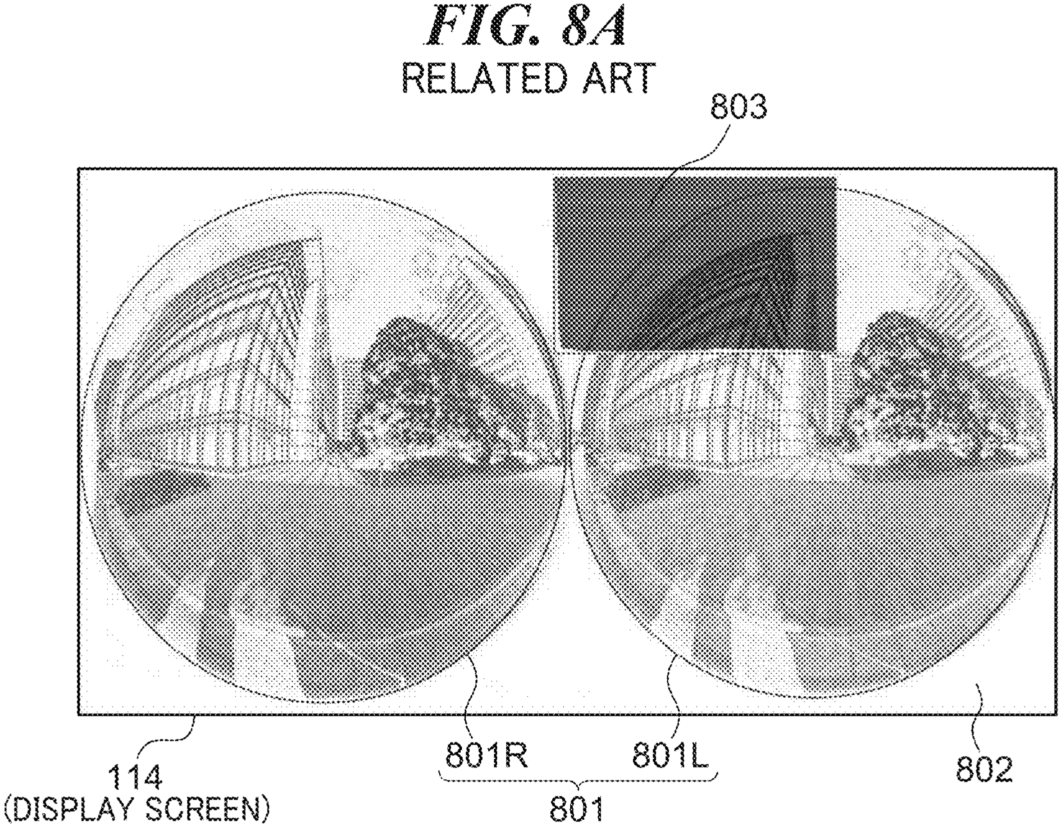
FIG. 8A RELATED ART
FIGS. 8A and 8B are diagrams showing an example of display of an image to be displayed and a luminance histogram according to a related art.

First, a conventional display example will be described. FIG. 8A is a diagram showing the conventional display example of an image to be displayed and a luminance histogram on the display screen of the display section 114. Note that the display screen of the display section 114 is a display screen on the rear monitor provided on the rear surface of the image capturing apparatus 110, and a photographer observes the display screen from the rear side of the image capturing apparatus 110.

As described above, since the right-eye optical system 201R and the left-eye optical system 201L are each configured as the all-around fisheye lens, two substantially circular optical images (hereinafter referred to as the "image circles") are formed side by side in a right-left direction (longitudinal direction) of the image sensor 111 by the respective optical systems. Here, when displaying an optical image formed on the image sensor 111 on the display section 114, in general, processing for rotating the whole optical image on the imaging surface through 180 degrees (inversion processing in upper-lower and right-left directions) is performed by the image processor 113. Therefore, on the display screen in FIG. 8A, a right-eye image 801R expressing an image circle formed by the right-eye optical system 201R and a left-eye image 801L expressing an image circle formed by the left-eye optical system 201L are displayed, side by side, on the left side and on the right side, respectively.

Note that the right-eye image 801R can be displayed on the right side, and the left-eye image 801L can be displayed on the left side by performing image processing. However, in the present embodiment, the arrangement of the right-eye image 801R and the left-eye image 801L is not a problem, and hence it is assumed here that these images are arranged as described above. Further, although the right-eye image 801R and the left-eye image 801L are still images, these can be live view videos, or moving images being recorded or reproduced.

The whole area of the right-eye image 801R and the left-eye image 801L in a state in which the right-eye image 801R and the left-eye image 801L are displayed on the display screen as shown in FIG. 8A is defined as a "first area 801". At this time, a low-luminance area in which incident light from the lens barrel 200 is not irradiated and an optical image is not displayed is generated in four corners and upper and lower portions of the central part of the display screen, and this area is defined as a "second area 802". Note that although the second area 802 is generally displayed as a black-out area (black) on the actual display screen of the image capturing apparatus 110, the second area 802 is colorlessly expressed (in the base color) in FIG. 8A because the first area 801 and the second area 802 are only required to be distinguishable.

Figure 8B:
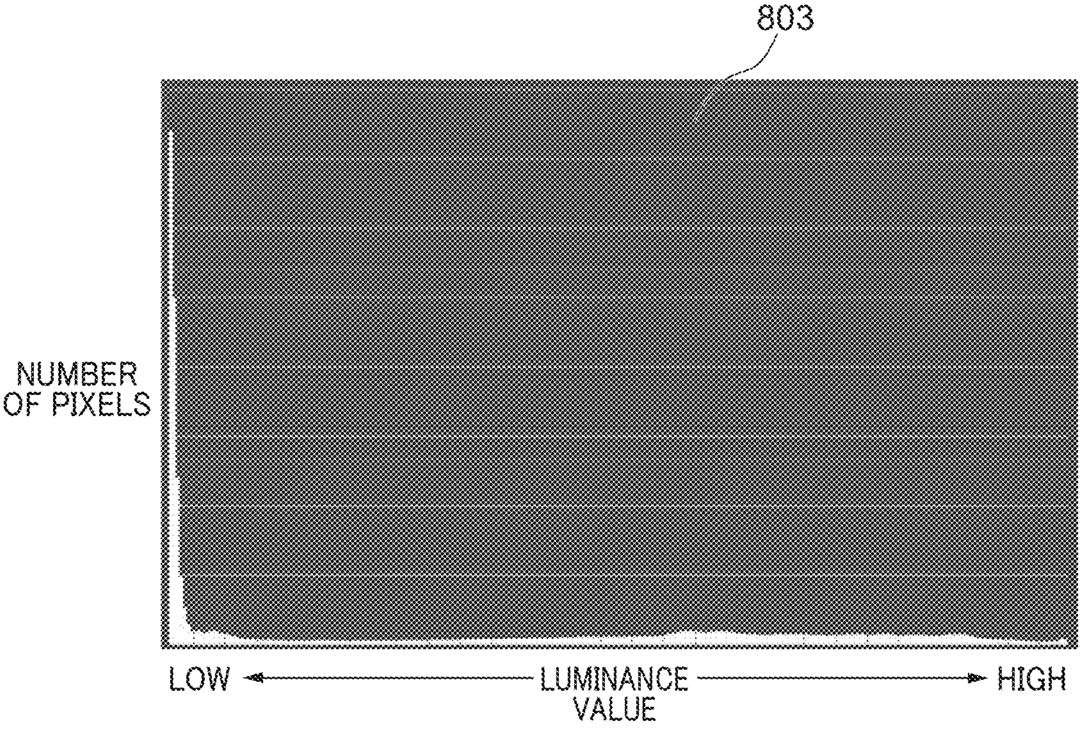
FIG. 8B RELATED ART

A luminance histogram 803 is displayed in a portion of the display screen. FIG. 8B is an enlarged diagram of the luminance histogram 803. The luminance information indicates distribution of the luminance values of all pixels of the image sensor 111. Therefore, the luminance histogram 803 expresses distribution of the luminance values, by consolidating the luminance information of an area corresponding to the first area 801 (hereinafter referred to as the "first pixel area") and the luminance information of an area corresponding to the second area 802 (hereinafter referred to as the "second pixel area") on the imaging surface of the image sensor 111. Ideally, a light flux having passed through the lens barrel 200 does not form an image on the second pixel area (light is not irradiated), and hence this area is low in luminance value. As a result, as shown in FIG. 8B, a large peak appears on the low-luminance side, and it is difficult to read the distribution of the luminance values in the first area 801 corresponding to the right-eye image 801R and the left-eye image 801L from this display. So, the first embodiment solves this problem and makes it possible to display a luminance histogram expressing the luminance information of the first pixel area (first area 801).

Figure 4A:
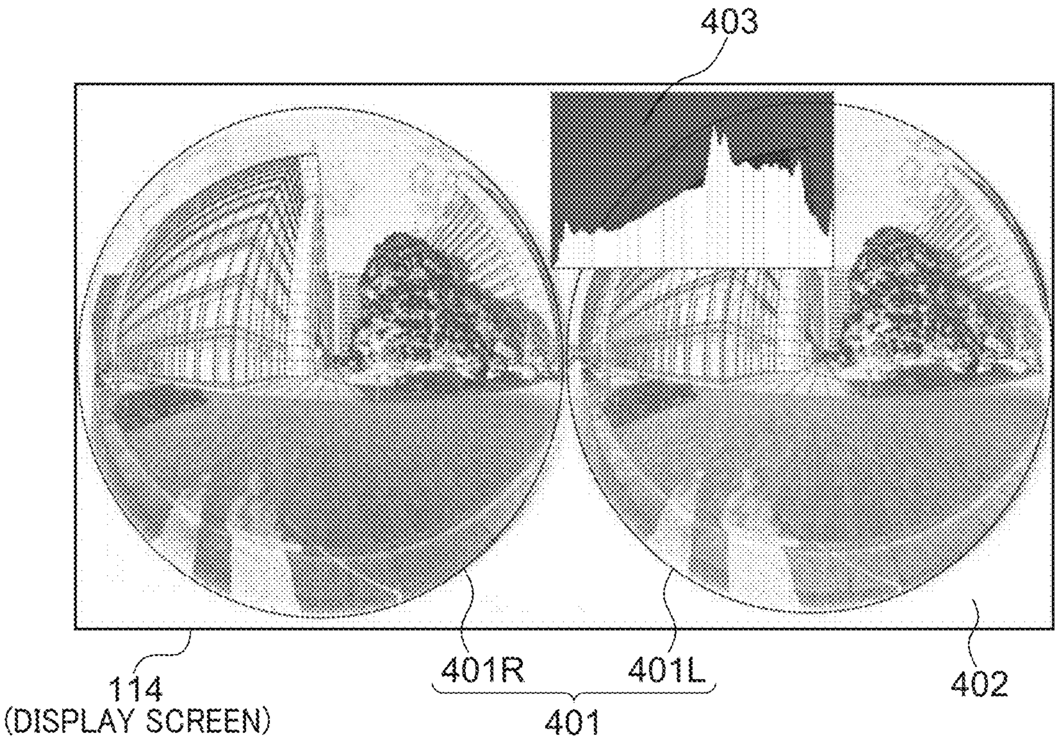
FIGS. 4A and 4B are diagrams showing an example of display of an image to be displayed and a luminance histogram in the first embodiment.

FIG. 4A is a diagram showing a display example of an image to be displayed and a luminance histogram on the display screen of the display section 114, according to the first embodiment. Note that a left-eye image 401L, a right-eye image 401R, a first area 401, and a second area 402 are the same as the right-eye image 801R, the left-eye image 801L, the first area 801, and the second area 802 in FIG. 8A, respectively. Similar to FIG. 8A, the second area 402 is also colorlessly displayed (in the base color) in FIG. 4A.

An area size and the number of effective pixels on the imaging surface of the image sensor 111 are stored in the storage section 118 of the image capturing apparatus 110 as the camera identification information (individual identification information). Further, an area of the two image circles (first pixel area) formed on the imaging surface of the image sensor 111 can be determined from the lens identification information (the optical design information and the manufacturing error information) of the lens barrel 200. Therefore, it is possible to calculate an area ratio of the first pixel area with respect to the imaging surface of the image sensor 111, and from this, it is possible to further calculate an area ratio of the second pixel area with respect to the imaging surface. Then, by multiplying the number of effective pixels of the image sensor 111 by the area ratio of the second pixel area, it is possible to determine the number of pixels in the second pixel area.

So, the system controller 117, first, generates the luminance histogram 803 shown in FIGS. 8A and 8B. That is, the system controller 117 consolidates the luminance information of the first pixel area and that of the second pixel area, which correspond to the first area 401 and the second area 402, respectively, into a histogram. Then, the luminance information corresponding to the number of pixels in the second pixel area is deleted from the luminance histogram 803 sequentially from the low-luminance side of the luminance histogram 803. With this, only the luminance information of the pixels included in the first pixel area are left, whereby a luminance histogram 403 expressing distribution of the luminance values in the first area 401 can be obtained and displayed on the display screen of the display section 114.

Figure 4B:
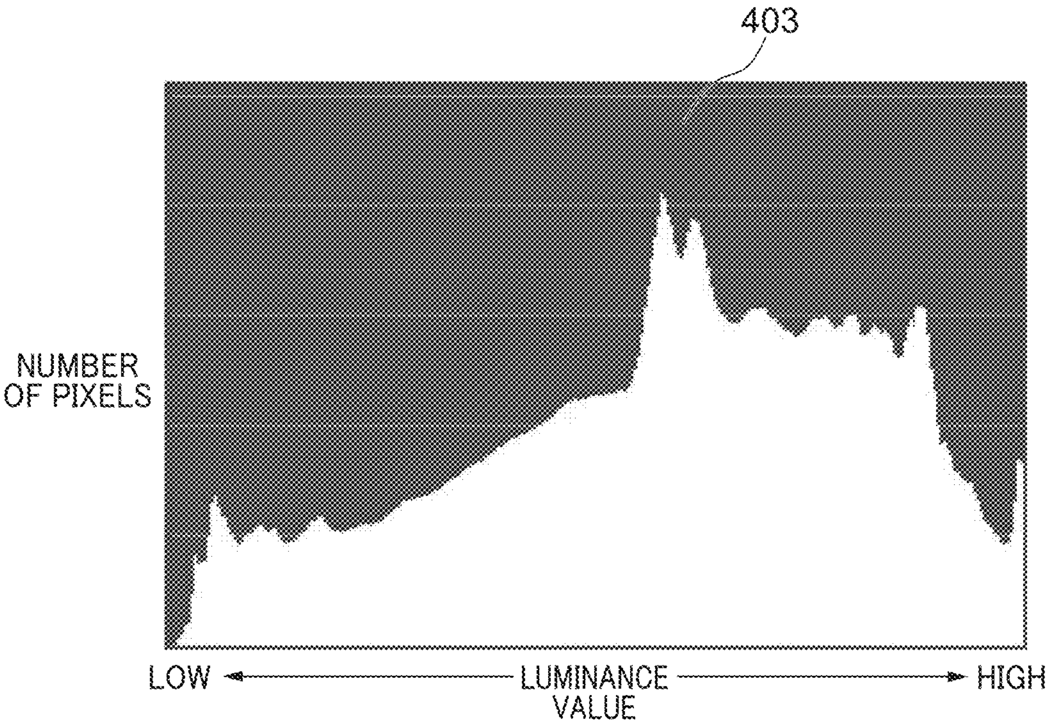

FIG. 4B is an enlarged diagram of the luminance histogram 403. The luminance histogram 403 does not include the luminance information of the second area 402, which is low in luminance, and hence, a large peak does not appear on the low-luminance side, which makes it possible to more clearly express the distribution of the luminance values on the high-luminance side than in the luminance histogram 803. This enables the user to easily recognize the distribution of the luminance values of the first area 401, whereby the user can easily perform exposure adjustment and the like.

Further, readout of signals from the pixels of the image sensor 111 is generally performed in the row direction (from top to bottom), and hence if only signals of pixels in the first pixel area are going to be read out, the readout control becomes complex. In contrast, in the above-described method, the luminance information corresponding to the number of pixels in the second pixel area can be deleted sequentially from the low-luminance side after reading out the signals of all pixels of the image sensor 111 by using the conventional readout method, and hence it is possible to reduce the calculation load of the system controller 117.

Note that it is desirable to display the luminance histogram 403 a lot in the second area 402 as much as possible and prevent the first area 401 from being hidden by the luminance histogram 403, but in doing this, it is more desirable to display the luminance histogram 403 so as not to hide at least one of the left-eye image 401L and the right-eye image 401R. So, in FIG. 4A, the luminance histogram 403 is arranged such that the right-eye image 401R is not hidden by the luminance histogram 403 and the most part of the luminance histogram 403 is displayed in the second area 402.

When the live view image is displayed, it is also possible to display the luminance histogram based on the settings made on the image capturing apparatus 110. In this case, similar to the above-described form except that, for example, the luminance histogram 403 is updated based on the frame images obtained at fixed time intervals, it is possible to display the distribution of the luminance values in the first area 401. As the process performed in a case where the luminance histogram is displayed when a moving image is captured, the method of displaying the luminance histogram when images for the live view are acquired can be applied. Note that the update timing of the luminance histogram 403 is not limited to the constant time intervals. For example, a moving body within a field of image capturing is detected, and the luminance histogram 403 can be updated when movement of the moving body is detected.

In a second embodiment, it is assumed that the image capturing system is formed by attaching a lens barrel (not shown) including one image capturing optical system formed by an all-around fisheye lens to the image capturing apparatus 110. Therefore, one substantially circular optical image is formed on the image sensor 111.

Figure 5:
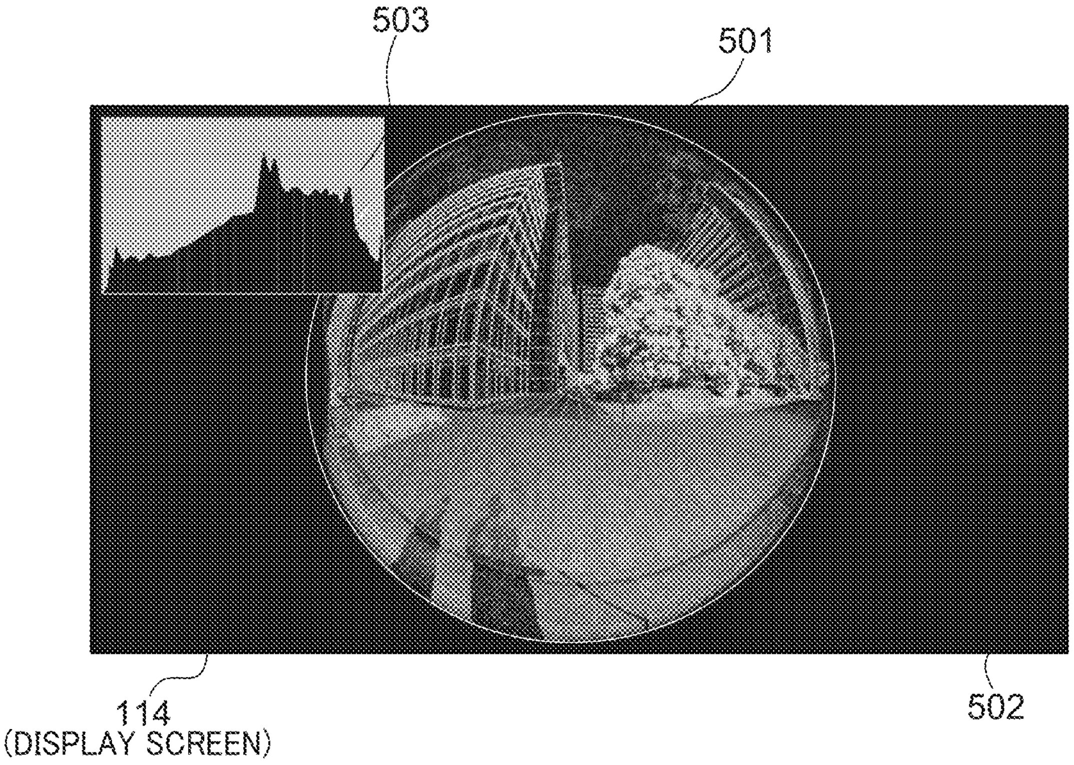
FIG. 5 is a diagram showing an example of display of an image to be displayed and a luminance histogram in a second embodiment.

FIG. 5 is a diagram showing a display example of an image to be displayed and a luminance histogram on the display screen of the display section 114, according to the second embodiment. A first area 501 (image to be displayed) corresponding to an image circle is displayed in substantially the center of the display screen of the display section 114, and an area around the first area 501 forms a second area 502 (area where incident light is not irradiated) and is displayed e.g. in black. However, similar to FIG. 4A, in FIG. 5, the second area 502 is colorlessly displayed.

In the second embodiment, although the number of pixels in the second pixel area can be obtained by using the same method as in the first embodiment, at this time, an area slightly smaller (e.g. 85% to 95%) than an area of an image circle obtained from the lens identification information is used. That is, a luminance histogram 503 is generated, by estimating the number of pixels in the second pixel area to be slightly larger. This makes it possible to prevent the luminance information of the pixels included in the second pixel area from being reflected on the luminance histogram e.g. by a relative positional displacement between the image capturing apparatus 110 and the lens barrel, and the user can accurately know the luminance information in an image capturing range (field of image capturing).

In the first and second embodiments, the number of pixels corresponding to the second area on the display screen is determined, and the luminance histogram expressing the luminance information of the pixels corresponding to the first area on the display screen is generated by deleting the luminance information corresponding to the obtained number of pixels sequentially from the low-luminance side. In contrast, in a third embodiment, a predetermined rectangular area is set on an image circle formed on the imaging surface of the image sensor 111, and a luminance histogram is generated by using the luminance information of the pixels in the set rectangular area.

Figure 6:
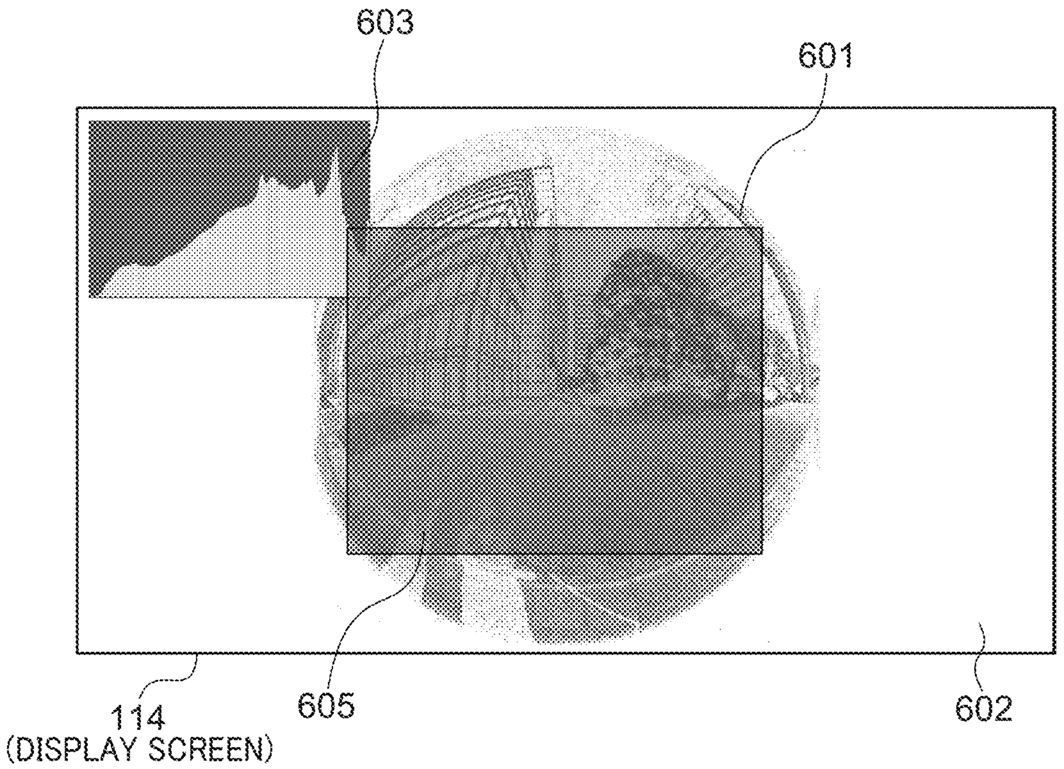
FIG. 6 is a diagram showing an example of display of an image to be displayed and a luminance histogram in a third embodiment.

FIG. 6 is a diagram showing a display example of an image to be displayed and a luminance histogram on the display screen of the display section 114, according to the third embodiment. In the third embodiment, it is assumed that, similar to the second embodiment, a lens barrel (not shown) including one image capturing optical system formed by an all-around fisheye lens is attached to the image capturing apparatus 110, and a substantially circular optical image is formed on the image sensor 111.

A first area 601 (image to be displayed) expressing an image circle is displayed in substantially the center of the display screen of the display section 114, and an area around the first area 601 forms a second area 602 (area where incident light is not irradiated) and is displayed e.g. in black. However, in FIG. 6, similar to FIG. 5, the second area 602 is colorlessly displayed.

Let it be assumed that the size (diameter) of the image circle formed on the imaging surface of the image sensor 111 has been made clear from the lens identification information. Further, the center of the imaging surface of the image sensor 111 and the center of the image circle formed on the imaging surface by the image capturing optical system basically coincide with each other. So, for example, the system controller 117 sets a rectangular area which is similar to the imaging surface and is inscribed in the image circle or becomes the maximum area within the image circle, reads out signals from the pixels in the set rectangular area, and generates and displays a luminance histogram 603. This enables the user to know the approximate luminance distribution in the first area 601.

In doing this, the rectangular area, denoted by reference numeral 605, from which the pixel signals have been read out, can be displayed on the display screen of the display section 114 in a state superimposed on the first area 601. At this time, it is desirable to adjust the transmittance of the rectangular area 605 so as to enable the user to roughly confirm the image to be displayed in the first area 601 through the rectangular area 605. This enables the user to confirm the image to be displayed in the first area 601 and easily understand of which area in the first area 601 the luminance information is reflected on the luminance histogram 603.

Note that as a representative example of the image sensor 111, a CMOS sensor can be mentioned, and it is possible to read out pixel signals from the CMOS sensor, generally, in a row direction. So, since an area for reading out the pixel signals in the image circle is set to a rectangular shape formed by two pairs of opposed sides, which are parallel to each other, of the CMOS sensor, it is possible to reduce the calculation load of the system controller 117.

The rectangular area inscribed inside the image circle is not necessarily required to be similar to the imaging surface of the image sensor 111, but for example, the rectangular area can be set to a rectangle of the maximum area inscribed in the image circle. Specifically, in a case where the shape of the image circle can be regarded as a perfect circle, the rectangle shape of the maximum area inscribed in the image circle is a square. In this case, a ratio of the square occupied in the image circle is approximately 64% ($2/\pi=0.636\ldots$). Further, not only the above-mentioned rectangle of the maximum area, but a rectangle having a sufficient area to make a user know the approximate luminance distribution in the image circle can be used.

Figure 7A:
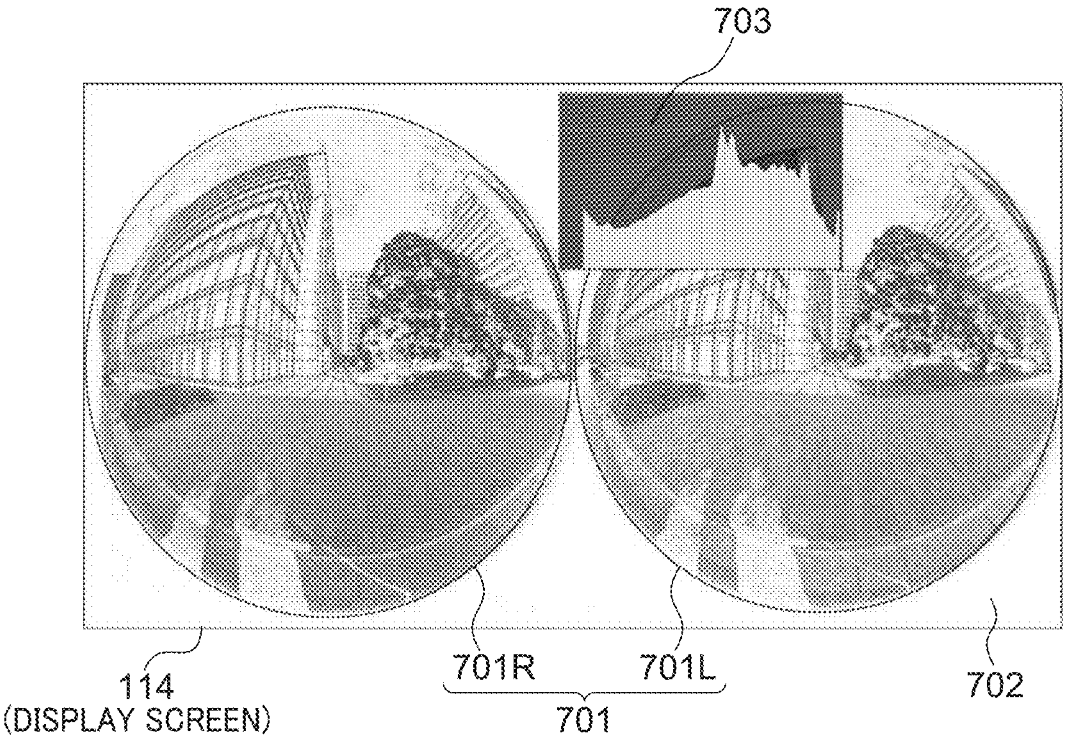
FIGS. 7A and 7B are diagrams showing an example of display of an image to be displayed and a luminance histogram in a fourth embodiment.
Figure 7B:
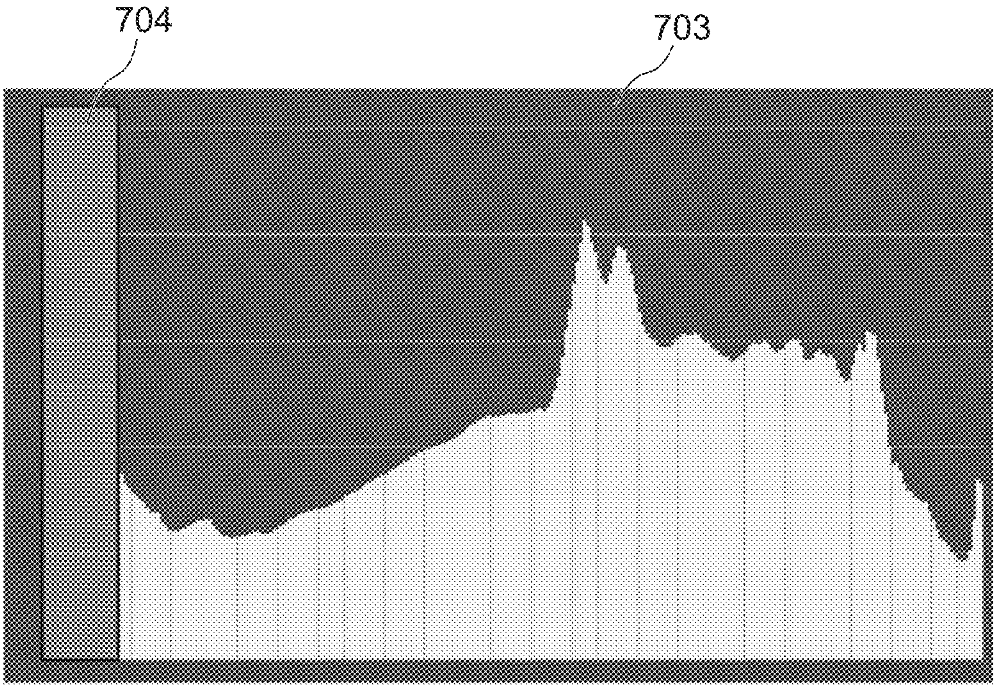

In a fourth embodiment, a variation of the display example in the first embodiment (see FIGS. 4A and 4B) will be described. FIGS. 7A and 7B are diagrams showing a display example of an image to be displayed and a luminance histogram on the display screen of the display section 114, according to the fourth embodiment. Note that a left-eye image 701L, a right-eye image 701R, a first area 701, and a second area 702 in FIG. 7A are the same as the right-eye image 401R, the left-eye image 401L, the first area 401, and the second area 402 in FIG. 4A, respectively.

As one of causes for generating a displacement between the image capturing optical axis of the lens barrel 200 and the center of the imaging surface of the image sensor 111, is mechanical looseness generated in connection between the camera-side mount 122 and the lens-side mount 202. If the positional relationship between the lens barrel 200 and the image sensor 111 deviates from an ideal state, pixel information of pixels positioned in the vicinity of the outer periphery outside the image circle corresponding to the first area 401 is reflected on the luminance histogram in place of pixels positioned in the vicinity of the outer periphery inside the image circle. Further, there is a case where even when the lens barrel 200 and the image sensor 111 are in the ideal positional relationship, the pixels positioned in the vicinity of the outer periphery outside the image circle corresponding to the first area 401 are affected by the incident light and do not necessarily have low luminance values. Further, in an image to be displayed, in which so-called black-out has occurred in the image circle due to e.g. insufficient exposure, the luminance values of pixels in the first pixel area corresponding to the first area 401 are sometimes lower than the luminance values of pixels in the second pixel area corresponding to the second area 402.

In addition, in the luminance histograms in the first and second embodiments, the luminance information on the low-luminance side is mechanically (automatically) deleted by the number of pixels corresponding to the second area 402 on the image sensor 111, and hence, it is desirable to show the user that this processing has been performed.

To this end, in the fourth embodiment, the system controller 117 generates a luminance histogram 703 expressing an area in which the luminance information sequentially and mechanically deleted from the low-luminance side is to be originally displayed, in a form distinguished from an area indicating the distribution of the remaining luminance values, and displays the generated luminance histogram 703 on the display section 114.

FIG. 7B is an enlarged diagram of the luminance histogram 703. In the luminance histogram 703, the area in which the luminance information mechanically and sequentially deleted from the low-luminance side is to be originally displayed is displayed as a subtraction area 704 in a form distinguished from the area indicating the distribution of the remaining luminance values. The subtraction area 704 can be displayed e.g. by hatching this area or filling this area with a transparent color.

Inevitably, the subtraction area 704 is displayed on the low-luminance side of the luminance histogram 703. The user can know that the luminance information of the subtraction area 704 has been subtracted from the whole luminance information of the image sensor 111. With this, for example, although the user visually recognizes that, clearly, there is a dark area in the first area 701, the user can recognize a possibility that the luminance values of this area are not reflected.

In the first to fourth embodiments, it is premised that the number of pixels corresponding to the second area on the display screen can be determined by using the camera identification information and the lens identification information. However, a case is assumed where it is impossible to identify the number of pixels in the second area because it is impossible to acquire the lens identification information or it is impossible to identify the first pixel area from the lens identification information.

In this case, if the fisheye lens is the monocular type as in the second embodiment, a luminance histogram is generated by using the camera identification information and the number of pixels in the second pixel area, which is determined by regarding a circle in contact with the long sides of the imaging surface and having the maximum diameter, as the first pixel area. Further, if the fisheye lens is the binocular type as in the first embodiment, a luminance histogram is generated by using the camera identification information and the number of pixels in the second pixel area, which is determined by regarding two circles which can be included within the imaging surface and have the maximum diameter and the same in size, as the first pixel area. Thus, it is possible to generate the luminance histogram on which the luminance information of an object is mostly reflected.

The disclosure has been described based on the preferred embodiments thereof. Note that the embodiments are not intended to limit the scope of the disclosure. Multiple features are described in the embodiments, but limitation is not made to a disclosure that requires all such features, and multiple such features can be combined as appropriate.

For example, the system controller 117 can be held in a casing different from the image sensor 111. Further, in the above-described embodiments, the disclosure is applied to the image capturing apparatus. This is because it is considered that conventionally, the fisheye lens has been widely used as an interchangeable lens of the image capturing apparatus, but in recent years, a clip-type fisheye lens which can be removably attached to a camera of a smartphone is commercially available. Taking this into account, it is clear that the disclosure can be widely applied to electronic apparatuses, such as a smartphone and a tablet PC, which has the image capturing function using an image sensor. In a case where it is impossible to determine the first pixel area on the imaging surface of the image sensor 111 due to the optical specification of the clip-type fisheye lens, the method described in the fifth embodiment can be used.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-008532 filed Jan. 24, 2024, which is hereby incorporated by reference herein in its entirety.

What is claimed is:

1. An image processing apparatus comprising:

at least one processor; and a memory storing instructions that, when executed by the at least one processor, configure the at least one processor to function as:

an acquisition unit configured to acquire image signals of an optical image which is formed by an image capturing optical system and is captured by an image sensor, and design information of the image capturing optical system;

a detection unit configured to detect luminance information from the image signals; and a control unit configured to generate a histogram of the luminance information and display the generated histogram on a display device, wherein the control unit determines, based on the design information, a first area in which the optical image is formed on an imaging surface of the image sensor, and wherein the control unit determines, based on the design information, a second area in which the optical image is not formed on the imaging surface of the image sensor, calculates the number of pixels included in the second area, and, after converting luminance values of all pixels of the image sensor to a histogram, generates the histogram to be displayed, being formed by luminance information of pixels included in the first area, by deleting luminance information corresponding to the number of pixels included in the second area sequentially from a low-luminance side.

2. The image processing apparatus according to claim 1, wherein the control unit displays, in the histogram, an area in which the luminance information deleted from the histogram sequentially from the low-luminance side is to be originally displayed, in a form distinguishable from an area indicating distribution of the remaining luminance values.

3. The image processing apparatus according to claim 2, wherein the area in which the deleted luminance information is to be originally displayed is displayed by hatching the area or filling the area.

4. The image processing apparatus according to claim 1, wherein the first area is one or two substantially circular areas included in the imaging surface as viewed from a direction orthogonal to the imaging surface.

5. The image processing apparatus according to claim 1, wherein the first area is substantially circular as viewed from the direction orthogonal to the imaging surface, and wherein the control unit generates the histogram by using luminance information of pixels included in a rectangular area set in the first area.

6. The image processing apparatus according to claim 5, wherein the rectangular area is similar to the imaging surface of the image sensor or a square.

7. The image processing apparatus according to claim 5, wherein the control unit displays the rectangular area on the display device in a state superimposed on an image captured by the image sensor.

8. The image processing apparatus according to claim 1, wherein the control unit displays the histogram on the display device in a state superimposed on an image captured by the image sensor.

9. An image capturing apparatus comprising:

an image sensor that converts an optical image formed by an image capturing optical system to image signals; and at least one processor and memory holding a program which makes the processor function as:

an acquisition unit configured to acquire design information of the image capturing optical system;

a detection unit configured to detect luminance information from the image signals; and a control unit configured to generate a histogram of the luminance information and display the generated histogram on a display device, wherein the control unit determines, based on the design information, a first area in which the optical image is formed on an imaging surface of the image sensor, and wherein the control unit determines, based on the design information, a second area in which the optical image is not formed on the imaging surface of the image sensor, calculates the number of pixels included in the second area, and, after converting luminance values of all pixels of the image sensor to a histogram, generates the histogram to be displayed, being formed by luminance information of pixels included in the first area, by deleting luminance information corresponding to the number of pixels included in the second area sequentially from a low-luminance side.

10. An image capturing system including:

an image capturing apparatus; and a lens barrel that can be removably attached to the image capturing apparatus, wherein the lens barrel includes:

an image capturing optical system that guides incident light from an object to the image capturing apparatus; and a storage unit configured to store design information of the image capturing optical system, and wherein the image capturing apparatus comprises:

an image sensor that converts an optical image formed by the image capturing optical system to image signals;

a display device; and at least one memory and at least one processor which function as:

an acquisition unit configured to acquire the design information from the lens barrel;

a detection unit configured to detect luminance information from the image signals; and a control unit configured to generate a histogram of the luminance information and display the generated histogram on the display device, wherein the control unit determines, based on the design information, a first area in which the optical image is formed on an imaging surface of the image sensor, and wherein the control unit determines, based on the design information, a second area in which the optical image is not formed on the imaging surface of the image sensor, calculates the number of pixels included in the second area, and, after converting luminance values of all pixels of the image sensor to a histogram, generates the histogram to be displayed, being formed by luminance information of pixels included in the first area, by deleting luminance information corresponding to the number of pixels included in the second area sequentially from a low-luminance side.

11. The image capturing system according to claim 10, wherein the lens barrel is an all-around fisheye lens.

12. A method of controlling an image processing apparatus, comprising:

acquiring image signals of an optical image formed by an image capturing optical system, by using an image sensor;

acquiring design information of the image capturing optical system;

detecting luminance information from the image signals;

determining, based on the design information, a first area in which the optical image is formed on an imaging surface of the image sensor;

determining, based on the design information, a second area in which the optical image is not formed on the imaging surface of the image sensor;

calculating the number of pixels included in the second area, and;

after converting luminance values of all pixels of the image sensor to a histogram, generating a histogram to be displayed, being formed by luminance information of pixels included in the first area, by deleting luminance information corresponding to the number of pixels included in the second area sequentially from a low-luminance side; and displaying the histogram on a display device.

13. A non-transitory computer-readable storage medium storing a program for causing a computer to execute a method of controlling an image processing apparatus, wherein the method comprises:

acquiring image signals of an optical image formed by an image capturing optical system, by using an image sensor;

acquiring design information of the image capturing optical system;

detecting luminance information from the image signals;

determining, based on the design information, a first area in which the optical image is formed on an imaging surface of the image sensor;

determining, based on the design information, a second area in which the optical image is not formed on the imaging surface of the image sensor;

calculating the number of pixels included in the second area, and;

after converting luminance values of all pixels of the image sensor to a histogram, generating a histogram to be displayed, being formed by luminance information of pixels included in the first area, by deleting luminance information corresponding to the number of pixels included in the second area sequentially from a low-luminance side; and displaying the histogram on a display device.

* * * * *